May 17, 1938.  J. FISHER  2,117,877

ROLLER BEARING

Filed July 21, 1937

INVENTOR.
Jacob Fisher.
BY Joshua E. H. Potts
ATTORNEY.

Patented May 17, 1938

2,117,877

UNITED STATES PATENT OFFICE 2,117,877

ROLLER BEARING

Jacob Fisher, Philadelphia, Pa.

Application July 21, 1937, Serial No. 154,699

3 Claims. (Cl. 308—206)

This invention has to do with roller bearings and is concerned more particularly with bearing assemblies of the so-called cageless type.

At the present time it is common practice in the bearing art to provide a bearing assembly including bearing elements that reduce the friction between relatively rotatable parts, and which bearing elements are held in position by various cage structures. The present invention intends to simplify and improve this condition by providing a roller bearing assembly in which the need for a retaining cage is entirely obviated, and the bearing elements are maintained in effective position by the structure of the bearing elements themselves.

In carrying out this idea in a practical embodiment this invention contemplates an arrangement in which roller bearings are formed with truncated conically shaped ends, and with which roller bearings are associated spool members having conically shaped end pieces complemental to the ends of the bearing elements. Thus the spools and bearing elements interlock to provide an assembly which is maintained in position by the structure of the spool elements.

Various other more detailed objects and advantages of the invention are associated with the carrying out of the above noted objectives in a practical and simplified embodiment.

The invention, therefore, comprises a bearing assembly including inner and outer ring members formed with beveled edges. Disposed between the ring members are spool elements having end pieces of a truncated conical formation which engage with the beveled edges of the ring members to retain the spool elements in position. Interposed between the spool elements are roller bearing elements having truncated conically shaped ends that are complemental to and engage the end pieces of the spools.

Figure 1:
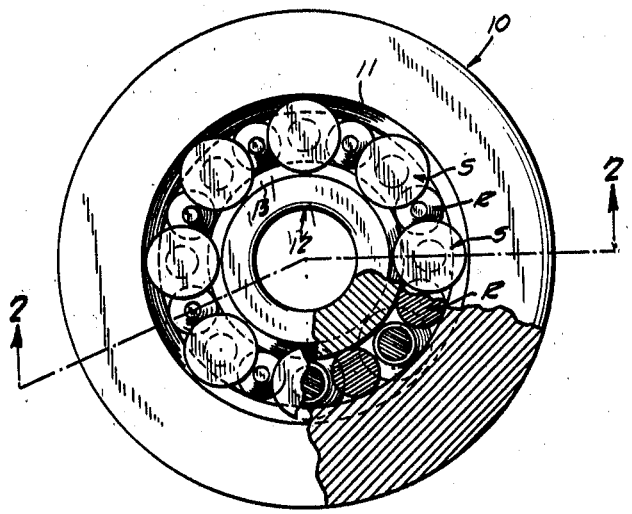
Figure 2:
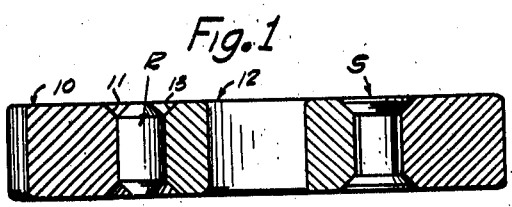
Figure 3:
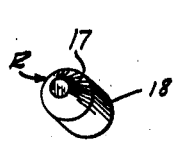
Figure 5:
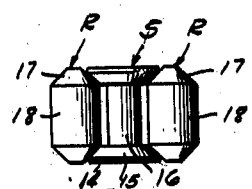
Figure 4:
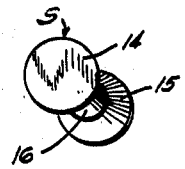

For a full and more complete understanding of the invention reference may be had to the following description and accompanying drawing, wherein Figure 1 is a plan view partly in section and partly in elevation of a bearing assembly made in accordance with the precepts of this invention, Figure 2 is a section taken through the planes represented by the lines 2—2 of Figure 1, Figure 3 is a detailed view in perspective of one of the roller bearing elements, Figure 4 is a similar perspective showing of one of the spool elements, and Figure 5 is a detailed showing bringing out the manner in which the roller bearing elements are assembled with the spool members.

Referring now to the drawing, wherein like reference characters denote corresponding parts, an outer ring member is designated 10, and is shown as formed with a beveled edge 11 about the opening that is defined by the ring member. An inner ring member 12 has an outer edge 13 that is also beveled in the same manner as is the edge 11. The ring members 10 and 12 are relatively rotatable in a well-known manner, and it is the purpose of the bearing assembly interposed therebetween to reduce the friction caused by relative rotation of these parts.

In accordance with this invention a plurality of spools designed to take up radial thrusts are designated S, and are shown as interposed between the rings 10 and 12. Each of the spools S is formed with an end piece 14 that has a conically shaped inner edge 15 that is complemental to the bevel edges 11 and 13. The end pieces 14 are connected by a cylindrical portion 16.

When the parts are assembled in the manner shown in Figure 1 the spool structure serves to maintain the said spool elements assembled in position between the ring elements 10 and 12, and these spool members S are spaced apart in the manner illustrated. Interposed between the adjacent spools S are roller bearings R each of which has a truncated conically shaped end 17 that is complemental to the bevel surface 15 of the spools. These truncated conical ends 17 engage the similarly conically shaped ends 14 of the spools S, and are thus retained in position.

Each of the spools R has a cylindrical surface 18, and the cylindrical surface 18 engages the corresponding cylindrical surfaces on the ring members 10 and 12 to reduce the friction therebetween.

Obviously either of the ring elements 11 and 12 may be of a sectional construction to facilitate assembly of the parts.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. A roller bearing assembly of the character described comprising an outer ring member and an inner ring member spaced therefrom, inner edges of the outer ring member, and the outer edges of the inner ring member being beveled, a plurality of spools disposed between said outer and inner ring members, each of said spools comprising end pieces having a conical shape that is complemental to the beveled edges of the said ring members and which end pieces are connected by a cylindrical body portion, and a plurality of roller bearing elements having a cylindrical surface engaging corresponding cylindrical surfaces of said ring members, and truncated conically shaped ends which are complemental to and in engagement with the conical ends of said spools.

2. A roller bearing assembly of the character described comprising an outer ring member and an inner ring member spaced therefrom, the inner edges of the outer ring member, and the outer edges of the inner ring member being beveled, a plurality of spools disposed between said outer and inner ring members, each of said spools comprising end pieces having a conical shape that is complemental to the beveled edges of the said ring members and which end pieces are connected by a cylindrical body portion, and a plurality of roller bearing elements having a cylindrical surface engaging corresponding cylindrical surfaces of said ring members, and truncated conically shaped ends which are complemental to and in engagement with the conical ends of said spools, the cylindrical surfaces of said rollers being spaced from the cylindrical surfaces of the said spools.

3. A roller bearing assembly of the character described comprising an outer ring member formed with an inner cylindrical surface which is beveled at each edge, an inner ring member formed with an outer cylindrical surface that is beveled at each edge, a plurality of spools disposed between said inner and outer ring members, each of said spools comprising a cylindrical body portion that is spaced from the cylindrical surfaces of said ring members, and end pieces at each end of the cylindrical shaped body portion and each of which end pieces is of a truncated conical formation complemental to and in engagement with said beveled edges, and a plurality of roller bearing elements alternately disposed between said spool members, each of said roller bearing elements having a cylindrical surface in engagement with the cylindrical surfaces of said inner and outer ring members and which cylindrical surface of the roller bearing element is spaced from the cylindrical surface of the spool members, each of said roller bearing elements having a truncated conically shaped end at each extremity thereof, and which conically shaped end is complemental to and in engagement with the conical end pieces of the spools.

JACOB FISHER.